United States Patent [19]

Belka

[11] Patent Number: 5,542,571
[45] Date of Patent: Aug. 6, 1996

[54] DISPENSING/VENDING MACHINE AND METHOD WITH DOUBLE DISPENSING PROTECTION

[75] Inventor: Jeffrey A. Belka, San Diego, Calif.

[73] Assignee: Lottery Enterprises, Inc., San Diego, Calif.

[21] Appl. No.: 288,274

[22] Filed: Aug. 8, 1994

[51] Int. Cl.⁶ .................................................. B65G 59/00
[52] U.S. Cl. ........................................... 221/268; 271/138
[58] Field of Search ................................ 221/197, 268; 271/137, 138

[56] References Cited

U.S. PATENT DOCUMENTS

| 1,027,598 | 5/1912 | Wolf | 271/137 |
| 4,405,124 | 9/1983 | Watanabe | 271/138 |
| 4,526,264 | 7/1985 | McNamara et al. | 194/1 N |
| 5,335,822 | 8/1994 | Kasper | 221/268 |

FOREIGN PATENT DOCUMENTS

| 36964 | 12/1979 | Australia . |
| 48363 | 1/1981 | Australia . |
| 70839 | 11/1981 | Australia . |
| 11404 | 8/1983 | Australia . |
| 12816 | 1/1984 | Australia . |
| 34657 | 5/1985 | Australia . |
| 41819 | 1/1986 | Australia . |
| 47082 | 3/1986 | Australia . |
| 4595989 | 6/1989 | Australia . |
| 45959 | 6/1990 | Australia . |
| WO87/03402 | 6/1987 | WIPO . |

Primary Examiner—Kenneth Noland
Attorney, Agent, or Firm—Curtis, Morris & Safford; Gregor N. Neff

[57] ABSTRACT

A vending machine for dispensing relatively flat, thin articles, and particularly for dispensing valuable articles such as debit cards and tickets. A blocking bar is mounted adjacent the outlet of the dispensing mechanism and is adjustably but firmly positioned to positively block the issuance of more than one ticket at a time in response to the action of a pusher member. A device preferably comprising one or more rollers is provided near the entrance to the blocking bar so as to bear down on and flatten curved cards or tickets to insure that they will not jam against the blocking bar due to their lack of flatness.

16 Claims, 3 Drawing Sheets

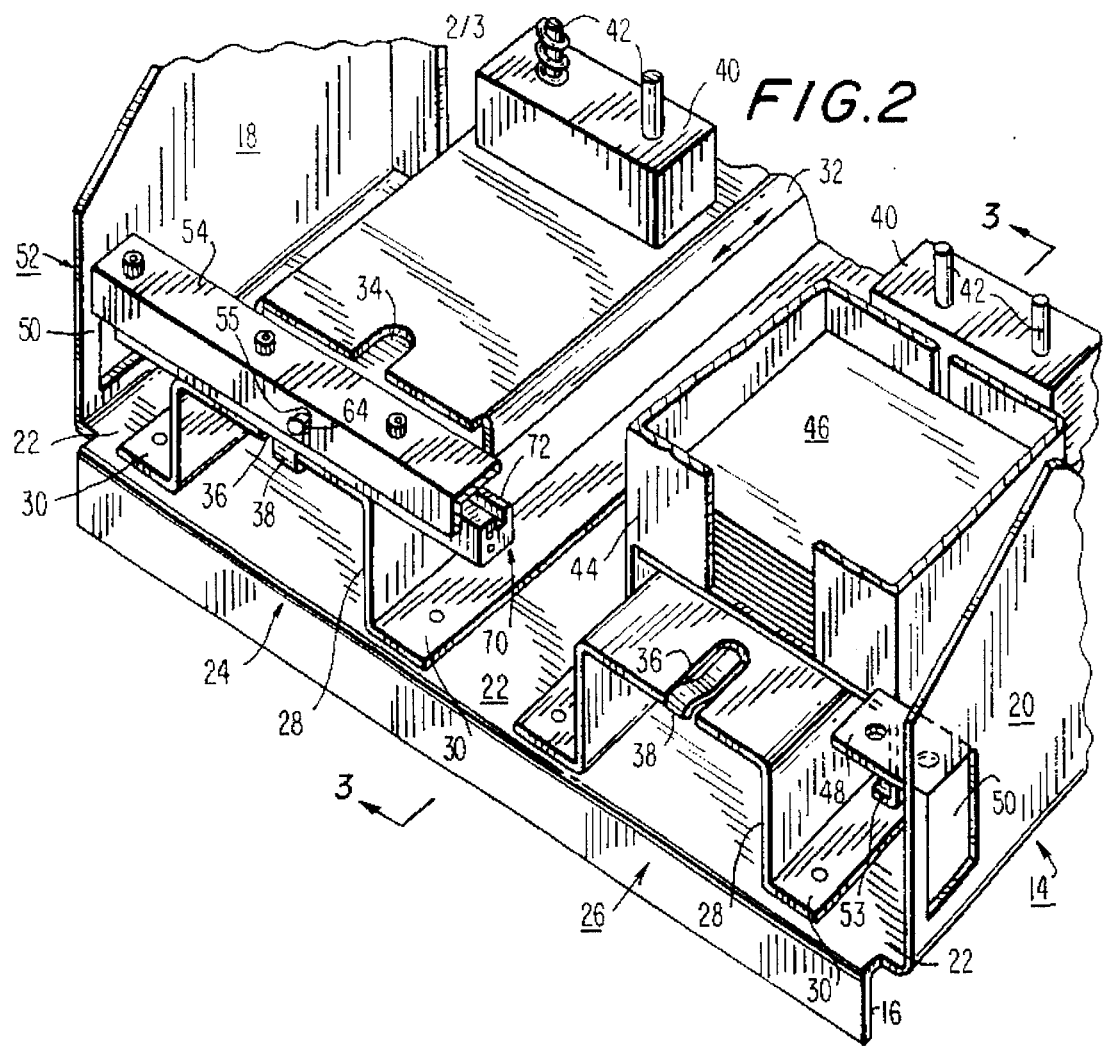
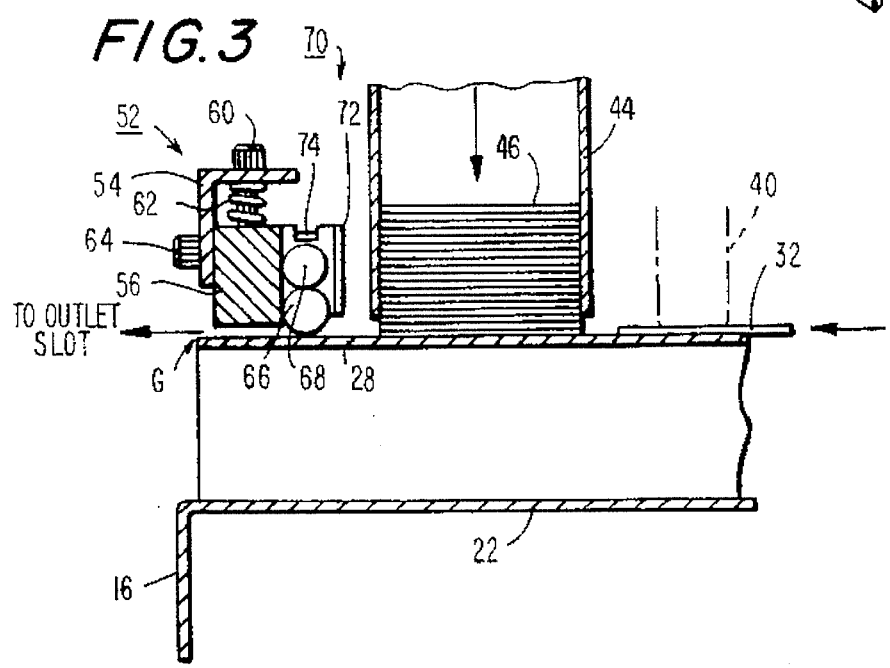

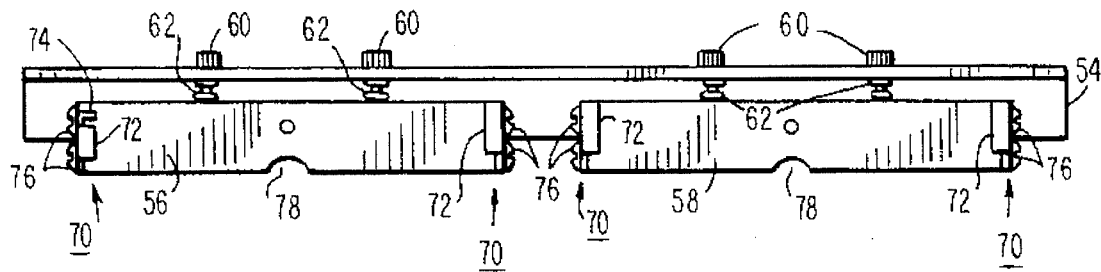
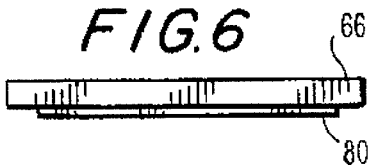
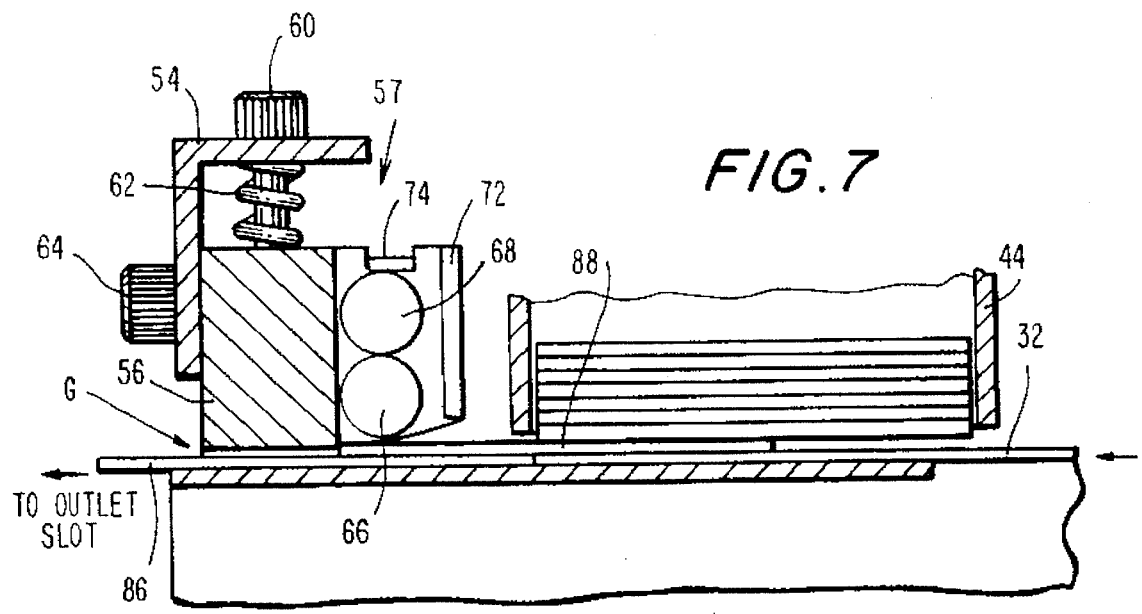

DISPENSING/VENDING MACHINE AND METHOD WITH DOUBLE DISPENSING PROTECTION

This invention relates to dispensing and vending devices, and particularly to such devices for dispensing and/or vending relatively thin, flat valuable articles such as lottery tickets and debit cards.

Machines for vending separate lottery tickets such as "pull-tab" tickets are being sold by Lottery Enterprises, Inc. of San Diego, Calif. Those machines use removable "drop-in" chutes to hold the tickets. Each chute can be simply lifted out and replaced by inserting a new chute into the receptacle vacated by the old chute. Thus, the games to be played and supplies of tickets can be changed quickly and easily. Moreover, the chutes can be pre-loaded with tickets at a distant location for greater loading speed, convenience and safety. One such machine which has proved to be particularly advantageous is shown in U.S. patent application Ser. No. 08/049,625, filed Apr. 16 1993 now abandoned, which is assigned to the same Assignee as this patent application.

The same and similar machines now are used in issuing "debit cards"—that is, cards which have recorded on them certain amounts of monetary credit corresponding to a payment made. Such cards can be used in telephones, transportation turnstile machines, and other devices designed to accept them. The telephone or turnstile machine subtracts a certain amount from the credit on the card corresponding to the use made of the telephone, etc. When the credit on the card is used up, the holder must buy a new card.

An improved machine specifically adapted for issuing debit cards is shown in U.S. patent application Ser. No. 132,383 filed Oct. 6, 1993 now abandoned, and is assigned to the same Assignee as this patent application.

The disclosures of both of the above-identified patent applications and their corresponding patents are hereby incorporated herein by reference.

Debit cards, lottery tickets and other tickets have a certain intrinsic value, and thus are desirable objects to steal. Applicants have recognized that this is a particularly serious problem in the case of debit cards, in that a single chute full of debit cards can be worth thousands of dollars, and every card can have a substantial value.

One particularly troublesome problem with dispensing such valuable objects is that of preventing the dispensing of more than one object when only one object has been paid for by the customer—the so-called "double-dispensing" problem. More than one object can be dispensed in some prior machines if two lottery tickets or debit cards are temporarily stuck together when dispensed.

Some prior dispensers use a spring-loaded plastic block with a rounded edge and a groove across the input edge to try to combat the double-dispensing problem. The block is spring-mounted to apply some pressure to the top object of the two that are stuck together so as to try to hold the top object back and allow only the lower object to be dispensed. However, this arrangement sometimes allows both tickets to go through.

The double-dispensing problem becomes a serious problem if the objects dispensed are valuable, like lottery tickets or debit cards. Debit cards typically have twenty-five dollars to fifty dollars in credits, which anyone can use and thus are worth twenty-five to fifty dollars. Losses of any significant number of debit cards due to double-dispensing simply is not tolerable.

Accordingly, it is an object of the invention to provide a dispensing/vending device which gives strong and positive protection against double-dispensing.

It is a specific object of the invention to provide a dispensing/vending machine for flat, relatively thin tickets or cards of intrinsic value in which double-dispensing is prohibited firmly and positively, and in which objects of varying thicknesses can be dispensed safely and reliably with the use of only simple adjustments to the mechanism.

It is a further object to provide a method of easily calibrating the gap provided by the double-dispensing protection means to adapt the dispenser to dispense objects of different thicknesses.

Another problem with dispensing objects of the type here under discussion is that the objects often are not completely flat. Many cards are bowed, and some have creases or wrinkles in them. Such objects often get jammed in the mechanism used to prevent double-dispensing. When the machine becomes jammed, it often requires servicing to correct the defect.

The jamming problem described above is exacerbated when a fixed, rigid member is used to positively prevent tickets from being dispensed simultaneously.

Accordingly, it is a further object of the invention to provide a dispensing/vending machine for relatively flat, thin articles in which the problem of jamming due to warpage or creasing or other distortion of the objects is eliminated or minimized.

In accordance with the present invention, the foregoing objectives are met by providing a dispenser mechanism with a fixed blocking member to positively prevent double-dispensing.

Also provided is at least one smoothing member bearing upon the object adjacent to the entrance to the blocking bar to flatten the object before it enters the space under the blocking bar. In a preferred embodiment, the smoothing member comprises one or more rollers, such as a solid steel roller, the weight of which smoothes and flattens the objects it passes under the roller.

The rollers preferably are loosely mounted so as to be movable vertically in response to objects of varying thicknesses.

In another aspect of the invention, a dispensing or vending machine is provided with a barrier member for stopping double-dispensing, while being adjustable to provide an exit gap of varying widths, with screw adjustment means. Springs are provided to assist in adjusting the gap and holding the gap setting during use.

The invention also provides a convenient and easy calibration method for setting the exit gap to facilitate dispensing objects of different thicknesses.

Other features and advantages of the invention are set forth in or apparent from the following description and drawings.

In the drawings:

FIG. 2 is a perspective view, partially broken-away, of portions of two dispensing mechanisms used in the vending machine shown in FIG. 1;

FIG. 3 is a cross-sectional view, partially broken-away and partially schematic, taken along line 3—3 of FIG. 2;

FIG. 4 is a rear elevation view of a portion of the mechanism shown in FIG. 2;

FIG. 5 is an end view of a relatively flat, thin object to be dispensed and which is warped;

FIG. 6 is a view of the object of FIG. 5 to be dispensed, having been flattened by a flattening member provided in accordance with the present invention; and FIG. 7 is a cross-sectional view similar to that of FIG. 3 illustrating the operation of the invention.

GENERAL DESCRIPTION

Figure 1:
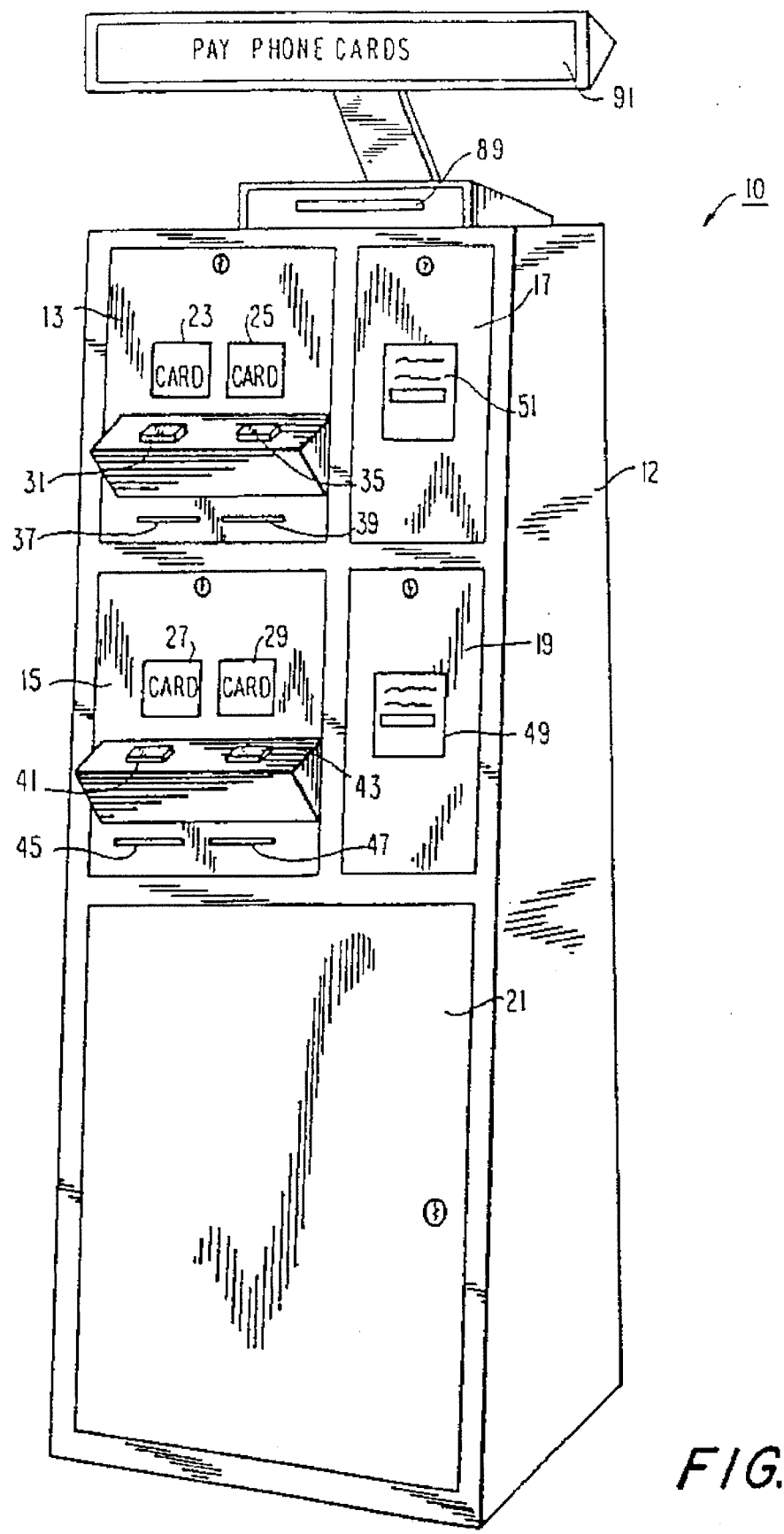
FIG. 1 is a perspective view of a vending machine using the present invention.

FIG. 1 is a perspective view of a debit card vending machine 10 constructed in accordance with the present invention. The vending machine 10 includes a housing 12 and hinged lockable front panels 13, 15, 17, 19 and 21.

Mounted inside the housing 12 behind each of the panels 13 and 15 is a pair of dispensing mechanisms (not shown in FIG. 1) for dispensing debit cards. Two such mechanisms 24 and 26 are shown in FIG. 2 and will be described in detail below.

Associated with each of the dispensing mechanisms is a window 23, 25, 27, or 29 which displays a sample of the card to be dispensed by the corresponding dispensing mechanism. Also associated with each dispensing mechanism is a push-button 31, 35, 41 or 43 which the customer can push to dispense one or more debit cards. The cards are dispensed through an outlet slot 37, 39, 45 or 47, each of the slots being associated with a specific one of the four dispensing mechanisms.

A monetary exchange acceptor 49 is mounted in the panel 19. The acceptor 49 preferably accepts currency, but also can accept other forms of monetary exchange, such as coins, credit cards, etc.

The panel 17 has a window 51 with operating instructions displayed behind the window.

A LED display unit 89 at the top of the machine 10 displays the amount of credit the customer has, and other information.

A separate electronic visual display 91 is supported above the top of the machine 10 to display an advertising message. In this particular case, the message displayed is "PAY PHONE CARDS", which indicates to the customer that the debit cards to be dispensed by the machine are of the type usable with pay phones.

Each of the panels 13, 15, 17, and 19 is hinged at the bottom so that it can be pivoted outwardly in order to give access to the mechanisms and/or electronics behind the panels.

The panel 21 is hinged at the side and is provided basically for storage.

DISPENSING MECHANISM

Referring now to FIG. 2, only the front parts of the dispensing mechanisms 24 and 26 are shown. This is because the invention resides in structural changes made at the front end of each dispenser, and the remaining structure of each dispenser is shown in the foregoing patent applications.

The dispensers 24 and 26 are mounted in a support structure 14 which houses them together as a pair.

The support structure 14 includes vertical side walls 18 and 20, a downwardly bent lower edge 16 serving as a support, and a base plate 22. These parts preferably are formed by bending a single piece of sheet metal.

Each dispenser 24 or 26 includes an inverted channel member 28 which has a pair of outwardly-extending flanges 30 which are secured to the base surface 22.

A pusher or "thruster" 32 fits onto the top of each of the channels 28. Only one pusher is shown in FIG. 2, for the sake of clarity in the drawings.

Each pusher 32 slides forwardly and backwardly on the top of the channel, as it is described in the above-identified co-pending patent applications. The pusher is driven in this motion by a motor and crank set (not shown), as it also is described in the above-identified co-pending patent applications.

A pair of "drop-in" chutes 44 is provided for holding objects 46 to be dispensed. Only one chute 44 is shown in FIG. 2, again for the sake of clarity. The chute 44 can be very tall, if desired, and is shown cut-off for the sake of compactness in the drawings.

Each of the pusher plates 32 has a slot 34 in the center of the forward end so as to avoid depressing a feeler switch 38 which is mounted in a slot in the forward upper edge of each channel 28. The feeler switch 38 detects the actual dispensation of one object, and the slot 34 prevents the pusher from creating a false indication by engaging the feeler switch during its reciprocating movement.

A pair of spring-loaded bearing blocks 40 which slide up and down on rods 42 with springs wound around them are provided in order to hold the pusher plate 32 against the upper surface of the channel 28, as it is further disclosed in the above-identified co-pending patent applications.

The lower side edges of each of the chutes 44 extends inwardly as shown at 53 to hold the objects 46 in the chutes when they are removed from the dispensing mechanism for changing the supply of objects, etc.

If desired, lockable chutes as described in the second of the above-identified co-pending patent applications, Ser. No. 132,383, can be used to provide further security for the transport of valuable objects stored in the chutes.

In each side wall 18 and 20 of the support structure 14, a rectangular tab 48 with mounting holes is punched out of the metal, leaving a rectangular hole 50. Only one of the tabs 48 is shown in FIG. 2. The other one is hidden by the cross-bar structure soon to be described, but extends from the left wall 18 just above the hole 50.

CROSS-BAR STRUCTURE

Referring now to FIGS. 2 and 3, as well as to FIG. 4, in accordance with the present invention a cross-bar structure 52 is secured at its ends to opposite tabs 48 and extends across the entire width of the two dispensing mechanisms shown in FIG. 2. The cross-bar structure 52 is shown broken away in FIG. 2 so as to clarify certain parts of the right side of the drawing, and to show some of the component parts of the cross-bar structure.

Referring particularly to FIG. 3, the cross-bar structure 52 includes a metal angle piece 54, a pair of blocker or barrier bars 56 and 58 (see FIG. 4), four gap adjustment screws 60, two for each blocker bar, and two locking screws 64, one for each blocker bar. As it is shown in FIG. 2, each locking screw 64 passes through a vertical slot 55 which allows the angle 54 and the bars 56 or 58 to move vertically relative to one another when the screw 64 is loosened.

Each screw 60 is threaded into a threaded hole in the upper surface of one of the blocker bars 56 or 58. Extending between the under surface of the horizontal portion of the angle 54 and the top of each blocker bar is a strong compression spring 62.

The cross-bar structure 52 is mounted so that the screws 60 can be adjusted to provide a gap "G" (FIG. 3) between the upper surface of the channel 28 and the bottoms of the blocker bars which is sufficient to allow one object to pass through the gap to be dispensed, but blocks any others from exiting during any one dispensing operation. The screw 64 then is tightened to lock the bar 56 or 58 in place.

FLATTENING STRUCTURE

In FIGS. 3 and 4, in particular, there is illustrated an object flattening structure comprising an end guide 70 at each end of the barrier bars 56 and 58. The end guides 70 hold one or a pair of smooth steel rods 66 and 68 which serve as weighted rollers. Each of the end brackets 70 is held in place at the end of a blocker bar by a pair of screws 76.

Each end bracket 70 includes a vertical retainer tab 72, and a horizontal retainer tab 74 near the top of the bracket. The vertical retainer tab 72 holds the steel rods 55 and 68 in a position immediately adjacent the inlet opening of the gap "G". The tab 74 limits the upward movement of each of the rollers 66 or 68 so that it will not come out of the brackets during use.

Preferably, each of the end brackets 70 is made of a single bent piece of sheet metal. The vertical tab 74 is formed by slitting the end wall of the bracket slightly at two places and then bending the metal over to form the tab. Preferably, the tab extends only a relatively short distance—a distance large enough to prevent the rollers 66 and 68 from jumping out of the brackets during use, but still allowing the rods 66 and 68 to be inserted and removed, at an angle, by insertion through the top opening 57 (FIG. 7) of the bracket structure. Thus, the rods 66 and 68 can be removed or added without dismantling the cross-member 52.

The compression springs 62 are relatively strong. Preferably, they are strong enough so that they will not allow the blocker bar 56 or 58 to be lifted up by any card or ticket which is pushed against it or under it.

The flattening rollers 66 and 68 operate in the manner shown in FIGS. 5 and 6. FIG. 5 is an end or side elevation view of a debit card, lottery ticket, or a similar object, which is slightly warped; that is, the ends 82 and 84 are bent upwardly slightly from the middle portion. This object, if it were to be pushed towards the gap "G" for dispensing, easily could jam in the gap due to the warpage. That is, the edges 82 and 84 well might catch on the barrier bar 56 or 58 and the dispenser would jam.

As it is shown in FIG. 6, where one of the rods 66 rests on the card 80, the weight of one of the rods in many cases is sufficient to flatten a single card.

A single solid stainless steel roller, approximately 100 m.m. (four inches) long and approximately 6 m.m. (¼ inch) in diameter, has been found to have sufficient weight to flatten most debit cards. However, some objects to be dispensed, such as "pull-tab" lottery tickets, which are relatively thick, require more weight to flatten them. Therefore, two of the rods 66 and 68 are stacked one on top of the other to give enough weight for these hard-to-flatten objects. More weight can be added by other means if needed.

OPERATION

FIG. 7 illustrates how the blocker bar 56 operates to prevent two cards 86 and 88 from being dispensed simultaneously.

The pusher plate 32 is selected to be thinner than the thickness of either card 86 or 88.

As the pusher plate 32 moves from the right and engages the right edge of the bottom card 86, it happens that cards 86 and 88 are temporarily stuck together. Thus, when card 86 is thrust forward, the top card 88 moves with it. The width of the gap "G" is greater than the thickness of the card 86 but substantially less than twice that thickness. Thus, when the left edge of the second card 88 reaches the rear edge of the blocker bar 56, it is stopped, positively and completely, by the blocker bar. The cards 86 and 88 then separate, and the lower card 86 is dispensed. The card 88 then is held in position and drops down, ready to be dispensed by the next movement of the pusher plate 32.

If the bonds holding the cards 86 and 88 together are so strong that they will not come apart under the thrust of the pusher 32, then the machine jams.

This requires servicing of the machine to eliminate the jam, but this is preferable to losing a card due to double-dispensing, especially since cards actually stick together with such strength only rarely.

If a card happens to be bowed, wrinkled or creased, the weight of the rollers 66 and 68 is sufficient to flatten them out before entering the gap "G", thus avoiding jamming As it can be seen in FIG. 7, the rollers 66 and 68 are pushed upwardly by the cards as they pass underneath. Thus, the cards are fed into the gap "G" in a flat condition so as to minimize jamming.

ADJUSTMENT METHOD

The following method is used to adjust the height of each of the blocker bars 56 and 58:

1. First, the locking screw 64 is loosened.
2. One of a number of calibration cards is selected. The calibration cards are cards which have a thickness which is greater than the thickness of certain objects to be dispensed by the dispenser. For example, for objects which are 30 mils thick, a 40 mil thick calibration card is used. Similarly, for objects 20 to 24 mils thick, a 30 mil thick calibration card is used. For objects 10 mils thick, a 15 mil thick calibration card is used, etc.
3. Next, if the gap "G" is too small, the screws 60 are turned to lift the bars 56 and 58 to enlarge the gap "G" to admit the calibration card, and the calibration card is inserted into the gap.
4. The screws 60 then are loosened sufficiently so that they are spaced slightly upwardly from the top of the angle 54. This allows the compression springs 62 to press the bars 56 and 58 downwardly with a substantial amount of force, thus pressing the calibration card firmly against the upper surface of the channel 28.
5. Each screw 60 is then turned in the opposite direction until the bar 56 or 58 is just free of the calibration card and the card can be moved in the gap "G". At this point, the gap "G" has been set at the desired width.
6. The locking screw 64 is turned to lock the bar 56 or 58 tightly against the vertical portion of the angle so as to lock it in place.
7. The calibration card is removed, and the dispensing device is ready to operate.

The compression springs 62 aid in the calibration process, and they also help to hold the bars 56 and 58 in place against vibration. The strength of the compression spring 62 is sufficient to hold the blocks and not allow them to move vertically during use, without the locking action of the screw 64. However, the locking screw 64 adds a safety factor helping to ensure proper operation over a relatively long period of time.

As it can be seen from the foregoing, the invention meets the above-stated objectives in a very satisfactory manner.

First, the dispensing of two cards or other objects when only one is supposed to be dispensed is made almost impossible. That is, double-dispensing is virtually eliminated.

One problem caused by the use of a fixed blocker bar for this purpose has been alleviated by the provision of the flattening mechanism consisting of one or more rollers bearing down upon the objects to be dispensed at a position where they enter the gap formed by the blocking bar.

Not only does this arrangement greatly reduce or eliminate jamming due to distorted or misshapen objects, but it has additional advantages over some prior dispensing mechanisms. Because the first object to be dispensed in prior dispensers had to lift up a spring-loaded plastic barrier member, jamming due to failure to be able to lift the barrier member has been essentially eliminated. By use of the present invention, the first object is dispensed just as easily as the remaining objects.

Furthermore, the blocker bar is easily adjusted vertically for dispensing a variety of different objects of different thicknesses. Thus, both debit cards and lottery tickets can be dispensed using the same mechanism.

In addition, the cross-bar structure 52 easily can be used to retrofit existing equipment to take advantage of the invention. The structure 52 simply replaces the structure appearing at that location in prior dispensers.

The special advantages of the invention in dispensing very valuable items, such as debit cards, is readily apparent. Since essentially no double-dispensing occurs, large losses to the owner or operator of the dispensing machines are avoided.

The above description of the invention is intended to be illustrative and not limiting. Various changes or modifications of the embodiments described may occur to those skilled in the art and these can be made without departing from the spirit or scope of the invention.

I claim:

1. A dispenser for dispensing relatively thin, flat objects, said dispenser comprising, in combination, a thruster mechanism for thrusting against the edge of one of said objects to dispense it, a barrier member mounted in the path of travel of said object and dimensioned to block the dispensing of more than one of said objects at a time, but allow one of said objects to be dispensed, and a flattening member bearing against said object to flatten it before reaching said barrier member.

2. A dispenser as in claim 1 in which said flattening member comprises a roller.

3. A dispenser as in claim 1, a flat base surface on which said object moves while being dispensed, including a holder for holding a stack of said objects on said base surface, said thruster mechanism including a thrusting member mounted to slide on said base surface, engage the bottom one of said objects and thrust it towards a dispensing position, said barrier member comprising a bar secured at a pre-selected height above said base surface, said height being greater than the thickness of one of said objects but less than the thickness of two of said objects, and a mounting mechanism for mounting said bar at an adjustable height above said base surface.

4. A dispenser as in claim 1 in which said objects are selected from the group consisting of debit cards and pre-cut lottery tickets.

5. A dispenser as in claim 1 including a flat base surface on which said object moves while being dispensed, said barrier member comprising a bar with a mounting device for positioning said bar at a variable height above said base surface, said mounting device comprising a support member secured to said base surface, a plurality of adjustment screws each extending between said support member and said bar and operable to adjust the distance between said support member and said bar, and a plurality of coil compression springs each mounted between said bar and said support and surrounding one of said screws.

6. A dispenser as in claim 5 including a support member having a slot and including a locking screw passing through said slot and being threaded into a threaded hole in said bar.

7. A dispenser for dispensing relatively thin, flat objects, said dispenser comprising, in combination, a thruster mechanism for thrusting against the edge of one of said objects to dispense it, a barrier member mounted in the path of travel of said object and dimensioned to block the dispensing of more than one of said objects at a time, but allow one of said objects to be dispensed, and a flattening member comprising a roller bearing against said object to flatten it before reaching said barrier member, in which said roller is mounted so as to move freely vertically, said dispenser including a flat base surface on which said object moves while being dispensed, said roller bearing downwardly on said object to press it against said base surface.

8. A dispenser as in claim 7 including a vertical end retainer guide for retaining the ends of said roller against lateral movement while guiding said ends in vertical movement in response to being lifted by the passage of one or more of said objects under said roller, said roller having a weight sufficient to flatten at least some types of objects to be dispensed.

9. A dispenser for dispensing relatively thin, flat objects, said dispenser comprising, in combination, a thruster mechanism for thrusting against the edge of one of said objects to dispense it, a barrier member mounted in the path of travel of said object and dimensioned to block the dispensing of more than one of said objects at a time, but allow one of said objects to be dispensed, and a flattening member comprising a roller bearing against said object to flatten it before reaching said barrier member, and including another roller resting on top of the first-named roller.

10. A device in or for a dispenser of relatively flat, thin objects and having a flat base surface, a thrusting device for thrusting the bottom object from a stack along said base surface to dispense said object, an adjustable barrier bar, a mounting support member for mounting said bar at a variable height above said base surface, at least one height adjustment screw in threaded engagement with and extending from said bar and through a hole in said support member, said screw being free to move longitudinally through said hole, and a compression spring between said support member and said bar and encircling said screw, and including locking means for locking said bar in a fixed position relative to said support member.

11. A device as in claim 10 including two of said height adjusting screws and compression springs mounted at locations spaced from one another.

12. A device in or for a dispenser of relatively flat, thin objects and having a flat base surface, a thrusting device for thrusting the bottom object from a stack along said base surface to dispense said object, an adjustable barrier bar, a mounting support member for mounting said bar at a variable height above said base surface, at least one height adjustment screw extending between said bar and said support member, and a compression spring between said support member and said bar and encircling said screw, said compression spring exerting a force, upon its compression, which is sufficient to prevent said bar from moving upwardly when one or more of said objects is thrust against said bar, and in which said support member has a vertical portion with a vertical slot in it, and a locking screw passing through said slot and being threaded into a threaded hole in said bar.

13. A method of calibrating an adjustable barrier bar to permit the dispensing of only one object at a time from a stack of relatively flat and thin objects, said bar being mounted at an adjustable distance from a base surface along which said objects slide during dispensing, said bar being supported by a screw adjustment mechanism with a compression spring for holding said bar down and preventing it from lifting when said objects are pushed against said bar, said method comprising the steps of:

inserting a calibration card under said bar;

adjusting said screw adjustment mechanism until said bar presses firmly against said card; and adjusting said screw adjustment mechanism until said bar allows said card to move freely under said bar.

14. A method as in claim 13 in which said calibration card is selected to be thicker than objects to be dispensed but thinner than twice the thickness of one of said objects.

15. A method as in claim 13 including the step of operating a locking screw to lock said bar at a selected height.

16. A method as in claim 13 including the stop of mounting a vertically movable and rotatable roller structure at a location adjacent to said bar, said roller structure having a weight sufficient to flatten each object to be dispensed before it goes under said bar.

* * * * *